US006860069B2

(12) United States Patent
Morris

(10) Patent No.: US 6,860,069 B2
(45) Date of Patent: Mar. 1, 2005

(54) BUILDING COMPONENT

(76) Inventor: Benedict George Morris, 66 Brooke Road, London N16 7RU (GB)

(*) Notice: Subject to any disclaimer, the term of this patent is extended or adjusted under 35 U.S.C. 154(b) by 0 days.

(21) Appl. No.: 10/408,632

(22) Filed: Apr. 7, 2003

(65) Prior Publication Data

US 2004/0074151 A1 Apr. 22, 2004

(30) Foreign Application Priority Data

Apr. 12, 2002 (GB) .............................. 0208480

(51) Int. Cl.[7] .................................. E04B 7/00
(52) U.S. Cl. .................. 52/2.22; 52/2.23; 52/2.11; 52/222; 52/791.1; 52/787.11
(58) Field of Search ................. 52/2.11, 2.13, 52/2.18, 2.19, 2.22, 2.23, 222, 455, 787.11, 791.1; 126/624; 5/681

(56) References Cited

U.S. PATENT DOCUMENTS 4,452,230 A * 6/1984 Nelson ................. 126/621
4,524,757 A * 6/1985 Buckley ................ 126/624
4,718,375 A * 1/1988 Krieger ................ 119/678
4,773,190 A    9/1988 Reade
4,807,405 A    2/1989 Borgquist
4,920,707 A    5/1990 Moskaliuk et al.
5,264,276 A   11/1993 McGregor et al.
5,512,356 A    4/1996 Haager
6,142,879 A * 11/2000 Phillips ................ 472/116
6,282,842 B1   9/2001 Simens

FOREIGN PATENT DOCUMENTS

DE      10142108 A1 * 5/2003    ........... E04H/15/20
FR       2117339 A      7/1972

* cited by examiner

Primary Examiner—Naoko Slack
Assistant Examiner—Jennifer I. Thissell
(74) Attorney, Agent, or Firm—Gary R. Jarosik; Mark R. Galis

(57) ABSTRACT

A building component for forming a roof. The component includes an ETFE foil cushion comprising sheets of ETFE foil which are held in a frame about their periphery, and which are inflated. The cushion includes a liquid retaining means to suppress rain noise.

20 Claims, 4 Drawing Sheets

BUILDING COMPONENT

RELATED APPLICATION

This application claims priority to and the benefit of United Kingdom patent application number 0208480.4, filed on Apr. 11, 2002, which application is herein incorporated by reference in its entirety.

BACKGROUND

The present invention generally relates to building components and, more particularly, but not exclusively, relates to building components for roofing, in the form of inflatable cushions.

Inflatable cushions comprise two or more layers of a plastics foil material such as ETFE (ethylene tetra flouro ethylene) inflated with low pressure air. The ETFE foil cushion is restrained in a perimeter frame usually manufactured from extruded aluminium, which in turn is fixed to a support structure. As the ETFE foil cushion is inflated, the ETFE is put under tension and forms a tight drum like skin. ETFE foil cushions are sold under a number of trade names, for example Texlon. ETFE cushions of this kind are fixed to a support structure to form a cladding and are used to enclose atria or other enclosed spaces to provide a transparent or translucent roof or facade to the enclosure, as an alternative to and in a similar way to glass. A number of buildings have been built using this technology most notably the Eden project in Cornwall, England.

Whenever a space is enclosed by a cladding system, due consideration needs to be given to the acoustic properties of the cladding system and how it affects the ambience of the enclosed space. ETFE foil cushions are acoustically fairly transparent having a sound reduction index of approximately 8 dBA. This is generally beneficial to the perceived acoustics of an enclosed space as the ETFE foil cushions act as acoustic absorbers to internally generated noise in that they only reflect a small proportion of the sound energy generated back into the enclosure. When it rains, however, the rain drums on the external surface of the inflated ETFE foil cushion and generates a loud noise, which can be obtrusive to the occupants.

SUMMARY OF THE INVENTION

It is the object of the present invention to reduce the amount of noise generated by rain falling on an ETFA foil cushion.

According to the invention there is provided a building component in the form of an inflatable cushion, comprising two or more sheets of plastics foil and a relatively rigid frame surrounding and supporting the foil sheets, and liquid retaining means associated with one of the sheets. Preferably, the frame is manufactured from a metal, e.g., extruded aluminium, which in turn is fixed to a support structure. Preferably, the sheets are made from ethylene tetra flouro ethylene (ETFE). Thus, the ETFE foil cushion is fitted with a device which reduces the effects of rain generated noise by reducing the vibration of the external layer of the inflated ETFE foil cushion by dampening it with a liquid. In addition, the sound reduction index of the inflated ETFE foil cushion is increased due to the increased mass of the ETFE foil cushion due to the addition of the liquid. Preferably, two of the sheets define a space between them which is inflated with air and the frame restrains the sheets about their perimeters, thereby forming the cushion.

In one exemplary embodiment, the liquid retaining means comprises means applied to the outer most sheet of the cushion, arranged to retain rain water on the surface of the outermost sheet. The liquid retaining means may comprises a woven material, a net, or a sheet which is holed, cut, textured or embossed. Alternatively, the liquid retaining means may comprise a further sheet of plastics material overlying the outermost sheet of the cushion thereby defining a fluid-tight compartment between the further sheet and the outermost sheet, the compartment being fillable with a liquid. Preferably, the further sheet is partially fixed to the outermost sheet. The fixing may be by means of welding, gluing or stitching. The sheets may be fixed together along lines, thereby defining the compartment as a continuous channel or at individual points.

Two exemplary ways of fitting the rain suppressor to the ETFE foil cushion are also described. Firstly, an open weave fabric, net, holed or textured material is patterned or shaped to fit over the outer surface of the cushion. When it rains, water gathers on the surface of the cushion which reduces the effects of rain drumming by damping, and increases the sound reduction index of the cushion by the increase of mass through the addition of water. Secondly, the outer skin of the cushion is effectively made up of two layers of ETFE foil welded together in places to form a continuous pipe or chamber. Water is introduced between the layers of foil, which reduces the effects of rain drumming by damping and increases the sound reduction index of the cushion by the increase of mass through the addition of water.

The invention also extends to a cladding system for a building, particularly a roof, comprising a plurality of building components as described, the frames of which are attached to a structure.

A better understanding of the objects, advantages, features, properties and relationships of the invention will be obtained from the following detailed description and accompanying drawings which set forth illustrative embodiments which are indicative of the various ways in which the principles of the system and method may be employed.

BRIEF DESCRIPTION OF THE DRAWINGS

For a better understanding of the invention, reference may be had to preferred embodiments shown in the following drawings in which.

DETAILED DESCRIPTION

Figure 1:
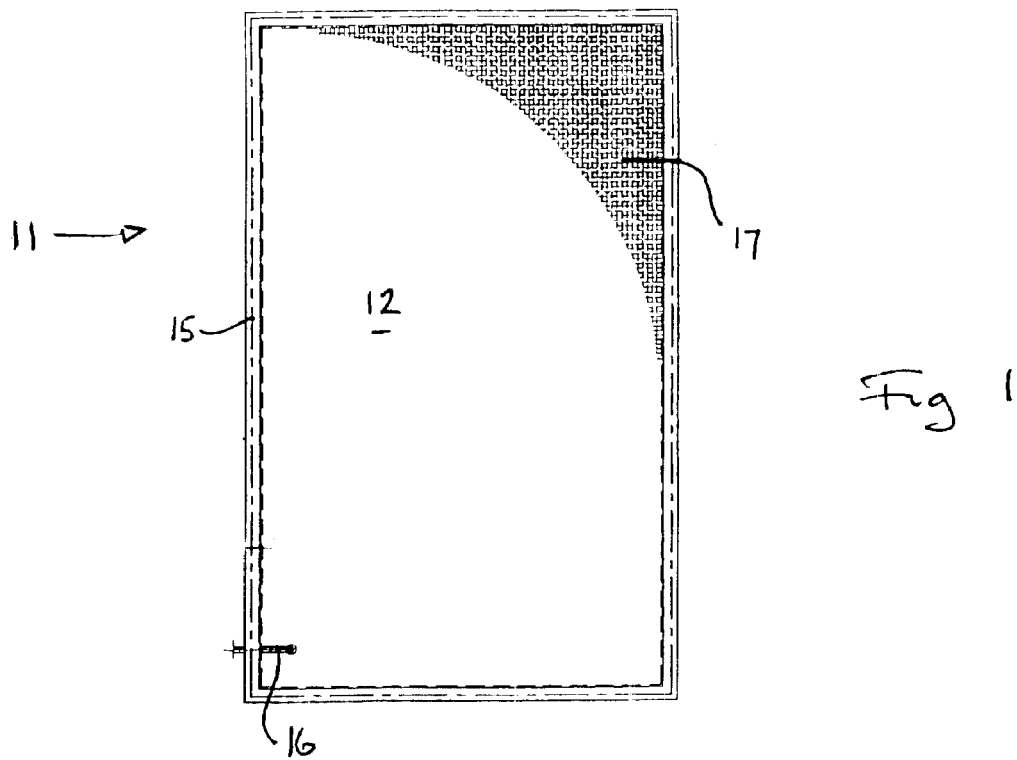
FIG. 1 is a plan view of an exemplary ETFE cushion constructed in accordance with the present invention.
Figure 2:
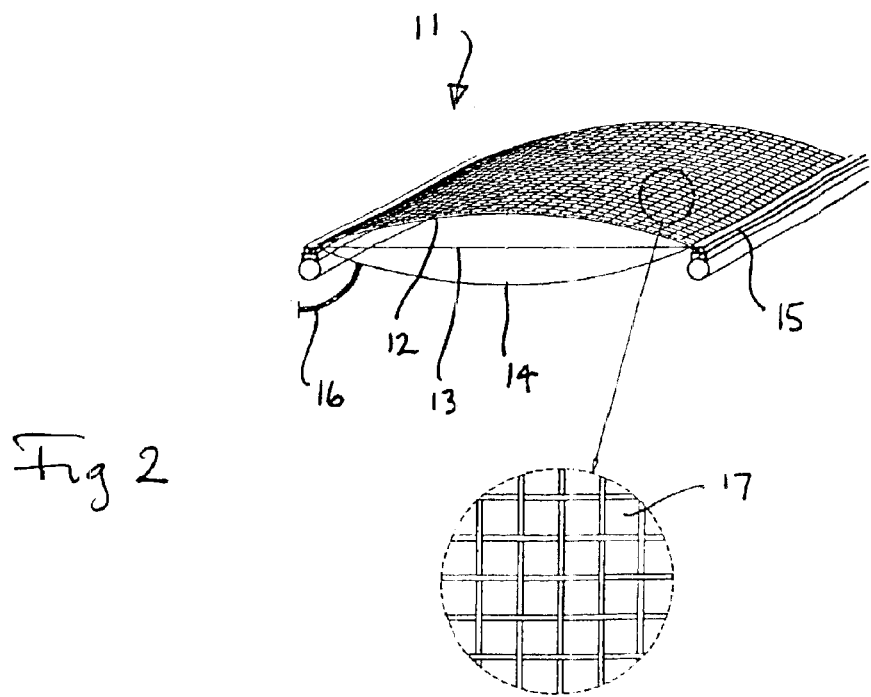
FIG. 2 is a perspective cross section through the assembly of FIG. 1.

Turning now to the figures, where like reference numerals refer to like elements, FIGS. 1 and 2 illustrate an exemplary embodiment of an ETFE cushion constructed in accordance with the invention. The cushion 11 comprises three rectangular ETFE foil sheets 12, 13, 14, a support frame 15 and a plenum 16. The frame 15 is located about the perimeter of the sheets 12, 13, 14 and incorporates a rain suppressor. The space between the sheets 12, 13, 14 is inflated with air via the plenum 16. Although shown as being rectangular, the cushion 11 could be of any convenient shape.

Figure 3A:
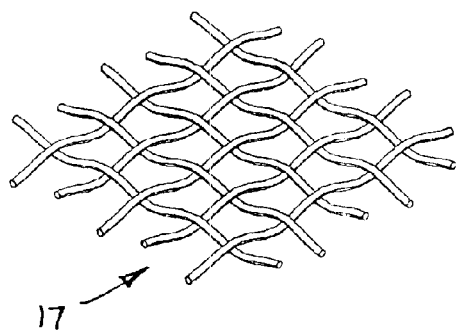
FIG. 3A to 3D show four different variants of covering.

The illustrated rain suppressor 17 is in the form of an open weave material stretched over the outside surface of the cushion 11. This is shown in more detail in FIG. 3A.

Figure 3B:
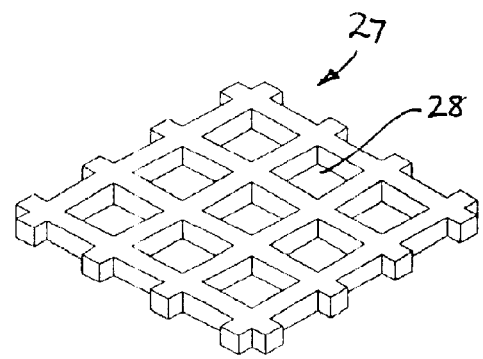

The variant shown in FIG. 3B is a film or extruded material 27 with punched holes 28, that would be stretched over the cushion 11. The holes 28 would typically be between 0.5 mm and 3 mm across, though other sizes would be possible.

Figure 3C:
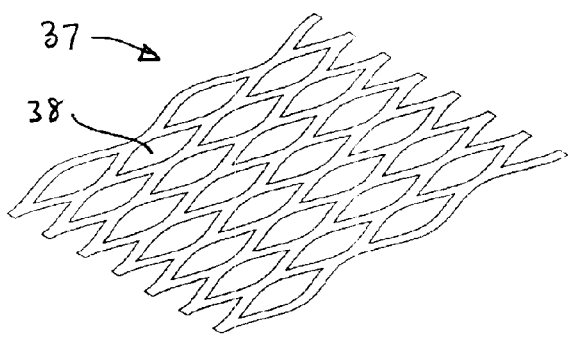

The variant shown in FIG. 3C consists of a film or extruded material 37 with small parallel cuts 38 made in it in a diamond pattern. The material is stretched to form a netlike material and then stretched over the outside surface of the cushion 11.

The fixing may be by means of welding, gluing or stitching. The sheets may be fixed together along lines, thereby defining the compartment as a continuous channel or at individual points.

Figure 3D:
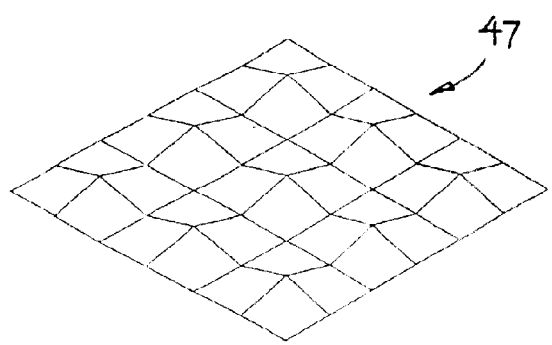
Figure 4:
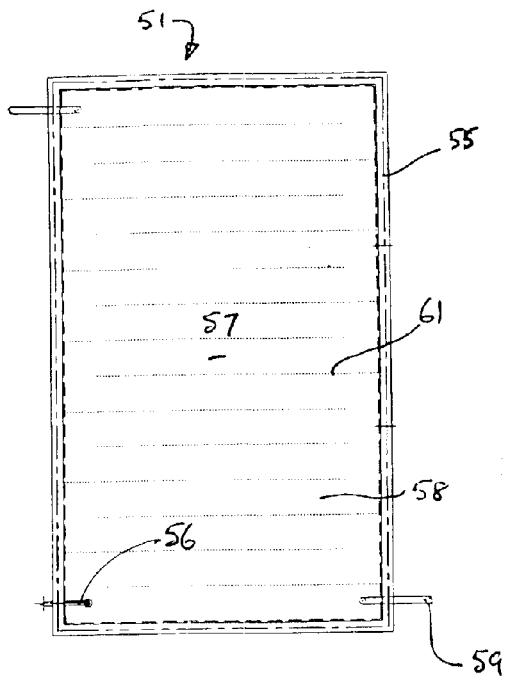
FIG. 4 is a view similar to FIG. 1 showing an alternative, exemplary embodiment.
Figure 5:
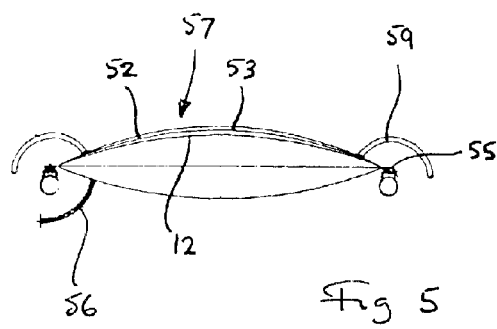
FIG. 5 is a cross section through the assembly of FIG. 4.

The variant shown in FIG. 3D consists of a film or extruded material 47, which has a textured or embossed surface and which is stretched over the outside face of the cushion 11. The function of the textured or embossed surface is to slow the passage of rain water over the surface of the cushion and clearly many textures and embossed patterns could perform this function.

The preferred material for all the variants in FIGS. 3A to 3D is ETFE due to its long life but clearly other films woven or extruded materials are possible.

The exemplary embodiment shown in FIGS. 4 to 7 consists of a frame 55 holding an ETFE foil cushion 51 which is inflated by air via a plenum 56 and which incorporates a rain suppressor 57 as is the case in the previous embodiment and its variants. In this case, however, the rain suppressor 57 consists of a further sheet 52 of an extruded material which is partially fixed by welding, gluing or stitching to the uppermost ETFE sheet 12 to form a fluid tight compartment 53 between the two sheets 12,52. The fluid tight compartment 53 is filled via a hose 59 with a distilled water.

When it rains or when the cushion 51 is required to form an acoustic barrier between two areas, fluid is introduced between the two sheets 12,52 to increase the mass of the cushion 51 and to damp the surface with fluid. Any fluid can be used although ideally it should be distilled water to ensure no residue is left in the compartment 53. The fluid should be pumped although alternative methods of introducing fluid in to the rain suppressor are possible, including gravity feed, fed by rainwater, etc.

Figure 6:
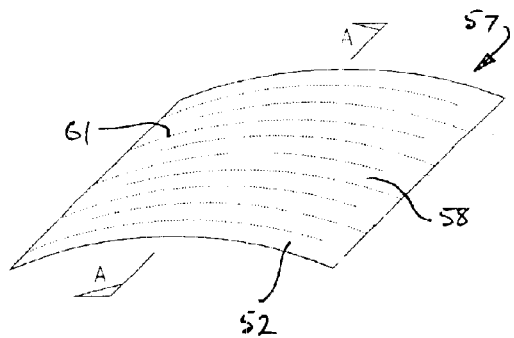
FIG. 6 is a three dimensional view of the embodiment of FIGS. 4 and 5.
Figure 7:
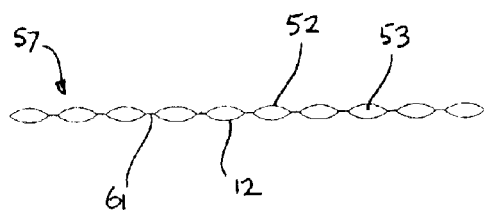
FIG. 7 is a section on the line A—A in FIG. 6.

FIGS. 6 and 7 show one possible way of fixing the two sheets 12,52 of material together. The fluid compartment 53 takes the form of a continuous channel 58 as the two sheets 12,52 are fixed together on the lines indicated at 61.

Figure 8:
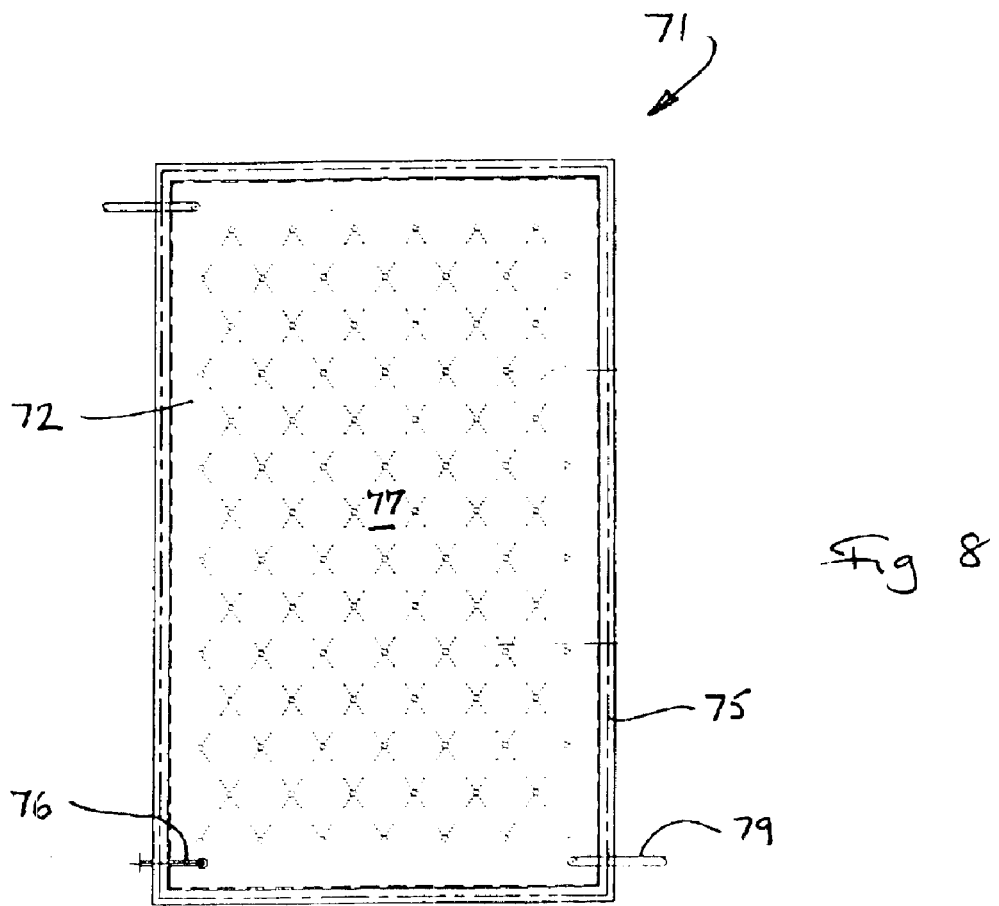
FIG. 8 is a view similar to FIG. 4 showing another alternative, exemplary embodiment.
Figure 9:
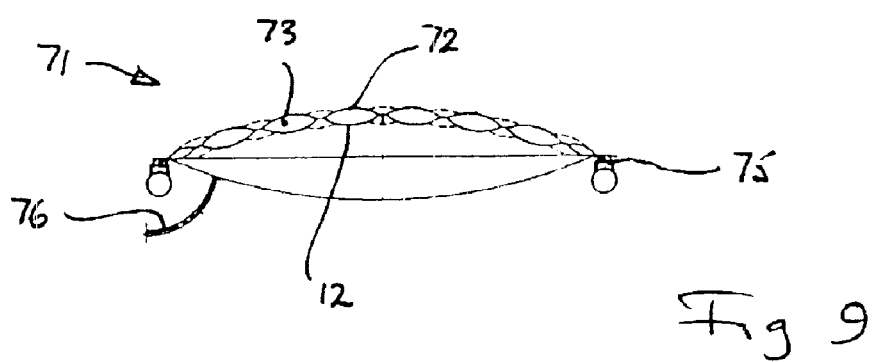
FIG. 9 is a cross section through the assembly of FIG. 8.

FIGS. 8 and 9 show a further exemplary embodiment similar to that of FIGS. 4 to 7. FIG. 8 shows a frame 75 holding an ETFE foil cushion 71 which is inflated by air via a plenum 76. The rain suppressor 77 again consists of a further sheet 72 of an extruded material but in this case, it is partially fixed by spot welding, gluing or stitching to the uppermost sheet 11 of the ETFE cushion 71 to form a fluid tight compartment 73 between the two layers. The fluid tight compartment 73 is filled via a hose 79 with distilled water.

While various embodiments of the invention have been described in detail, it will be appreciated by those skilled in the art that various modifications and alternatives to those details could be developed in light of the overall teachings of the disclosure. Accordingly, it will be understood that the particular arrangements and procedures disclosed are meant to be illustrative only and not limiting as to the scope of the invention which is to be given the full breadth of the appended claims and any equivalents thereof.

What is claimed is:

1. A building component in the form of an inflatable cushion, comprising at least two sheets of plastics foil and a relatively rigid frame surrounding and supporting the foil sheets, and liquid retaining means associated with one of the sheets wherein the liquid retaining means comprises means applied to an outermost, exterior sheet of the cushion and arranged to retain rain water on the outermost, exterior sheet.

2. A building component according to claim 1, wherein the sheets are made from ethylene tetra fluoro ethylene (ETFE).

3. A building component according to claim 1, wherein:
   two of the sheets each have a respective perimeter and define a space between them;
   the space is inflated with air, and
   the frame restrains the sheets about their perimeters, thereby forming the cushion.

4. A building component according to claim 1, wherein the frame is of metal.

5. A building component according to claim 1, wherein the liquid retaining means is a woven material.

6. A building component according to claim 1, wherein the liquid retaining means is a net.

7. A building component according to claim 1, wherein the liquid retaining means is a sheet with a surface having at least one feature selected from the group consisting of holes, cuts, texturing, and embossing.

8. A building component in the form of an inflatable cushion, comprising at least two sheets of plastics foil and a relatively rigid frame surrounding and supporting the foil sheets, and liquid retaining means associated with one of the sheets, wherein the liquid retaining means comprises a further sheet of plastics material overlying a sheet of the cushion, thereby defining a fluid-tight compartment between the further sheet and the said sheet, the compartment being fillable with a liquid; and wherein the further sheet is partially fixed to the said outermost sheet along lines, thereby defining the compartment as a continuous channel.

9. A building component according to claim 7, wherein the said further sheet and the said outermost sheet are together along lines being at least one selected from the group consisting of weld lines, glue lines, and stitch lines.

10. A cladding system for a building comprising a structure and a plurality of components as claimed in claim 8, the frames of the components being attached to the structure.

11. A building component in the form of an inflatable cushion, comprising at least two sheets of plastics foil and a relatively rigid frame surrounding and supporting the foil sheets, and liquid retaining means associated with one of the sheets, wherein the liquid retaining means comprises a further sheet of plastics material overlying a sheet of the cushion, thereby defining a fluid-tight compartment between the further sheet and the said sheet, the compartment being fillable with a liquid; the said sheet and the further sheet being fixed together at individual points.

12. A cladding system for a building comprising a structure and a plurality of components as claimed in claim 1, the frames of the components being attached to the structure.

13. A cladding system according to claim 12, wherein the sheets are made from ethylene tetra fluoro ethylene (ETFE).

14. A cladding system according to claim 12, wherein:
   two of the sheets each have a respective perimeter and define a space between them;
   the space is inflated with air, and
   the frame restrains the sheets about their perimeters, thereby forming the cushion.

15. A cladding system according to claim 10, wherein the sheets are made from ethylene tetra fluoro ethylene (ETFE).

16. A cladding system according to claim 15, wherein:
   two of the sheets each have a respective perimeter and define a space between them;
   the space is inflated with air, and
   the frame restrains the sheets about their perimeters, thereby forming the cushion.

17. A cladding system according to claim 10, wherein the said further sheet is partially fixed to the said outermost sheet along fixing lines being at least one selected from the group consisting of weld lines, glue lines and stitch lines.

18. A cladding system for a building comprising a structure and a plurality of components as claimed in claim 11, the frames of the components being attached to the structure.

19. A cladding system according to claim 18, wherein the sheets are made from ethylene tetra fluoro ethylene (ETFE).

20. A cladding system according to claim 18, wherein:
   two of the sheets each have a respective perimeter and define a space between them;
   the space is inflated with air, and
   the frame restrains the sheets about their perimeters, thereby forming the cushion.

* * * * *